United States Patent
Youngblood-Johnson

(10) Patent No.: US 7,431,498 B2
(45) Date of Patent: Oct. 7, 2008

(54) PORTABLE SUPINE PATIENT SUPPORT AND CASSETTE HOLDER

(76) Inventor: Jacquin Youngblood-Johnson, P.O. Box 277782, Riverdale, IL (US) 60827-7782

(*) Notice: Subject to any disclaimer, the term of this patent is extended or adjusted under 35 U.S.C. 154(b) by 183 days.

(21) Appl. No.: 11/391,995

(22) Filed: Mar. 29, 2006

(65) Prior Publication Data

US 2007/0237305 A1 Oct. 11, 2007

(51) Int. Cl.
G03B 42/02 (2006.01)
H01J 31/49 (2006.01)
H05G 1/00 (2006.01)

(52) U.S. Cl. .................. 378/177; 378/167; 378/189; 378/208

(58) Field of Classification Search ............... 378/20, 378/68, 167–170, 177, 182, 208, 209
See application file for complete search history.

(56) References Cited

U.S. PATENT DOCUMENTS

| | | | |
|---|---|---|---|
| 1,769,370 A | 7/1930 | Fabe et al. | |
| 2,569,561 A | 10/1951 | Friedman | |
| 3,738,251 A | 6/1973 | Haaser | |
| 3,774,045 A | 11/1973 | Trott | |
| 4,132,897 A | 1/1979 | Ohlson et al. | |
| 4,162,407 A | 7/1979 | Sharp | |
| 4,247,778 A | 1/1981 | Waerve | |
| 4,416,020 A | 11/1983 | Wagner et al. | |
| 4,497,406 A | 2/1985 | Takanashi | |
| 4,665,574 A | 5/1987 | Filips et al. | |
| 4,905,836 A | 3/1990 | Lindgren et al. | |
| 5,166,968 A | 11/1992 | Morse | |
| 5,365,565 A | 11/1994 | Barbaric | |
| 5,377,254 A | 12/1994 | Walling | |
| D378,951 S | 4/1997 | Youngblood | |
| 7,131,769 B2 * | 11/2006 | Vezina | 378/209 |
| 7,168,854 B2 * | 1/2007 | Ergun et al. | 378/196 |
| 7,331,712 B2 * | 2/2008 | Fischer et al. | 378/203 |
| 2001/0040939 A1 * | 11/2001 | Kobayashi | 378/177 |

* cited by examiner

*Primary Examiner*—Irakli Kiknadze
(74) *Attorney, Agent, or Firm*—Hovey Williams LLP

(57) ABSTRACT

An improved portable patient support and radiographic cassette holder includes first and second modules which include connectors for coupling the modules together without the need for tools to provide a base cassette receiver. The two modules are preferably identical in configuration, each including a base wall and a pair of sidewalls. The modules also preferably include a pair of arms which form partial end walls presenting a passage therebetween. The arms and the sidewalls include respective ledges and shelves, such that a support panel for a patient can be positioned thereon. An X-ray film cassette may be inserted through either end of base cassette receiver, and one or both of a headrest and a footrest may be mounted thereon. Patient restraints may be inserted through vertical slots in the sidewall.

18 Claims, 4 Drawing Sheets

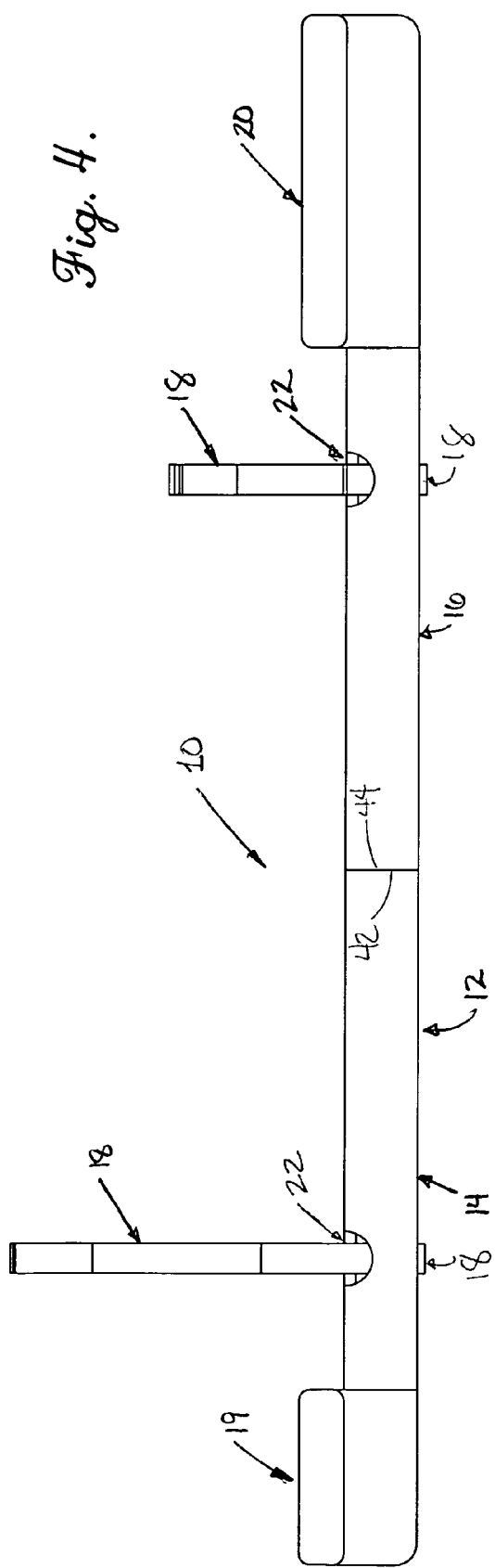
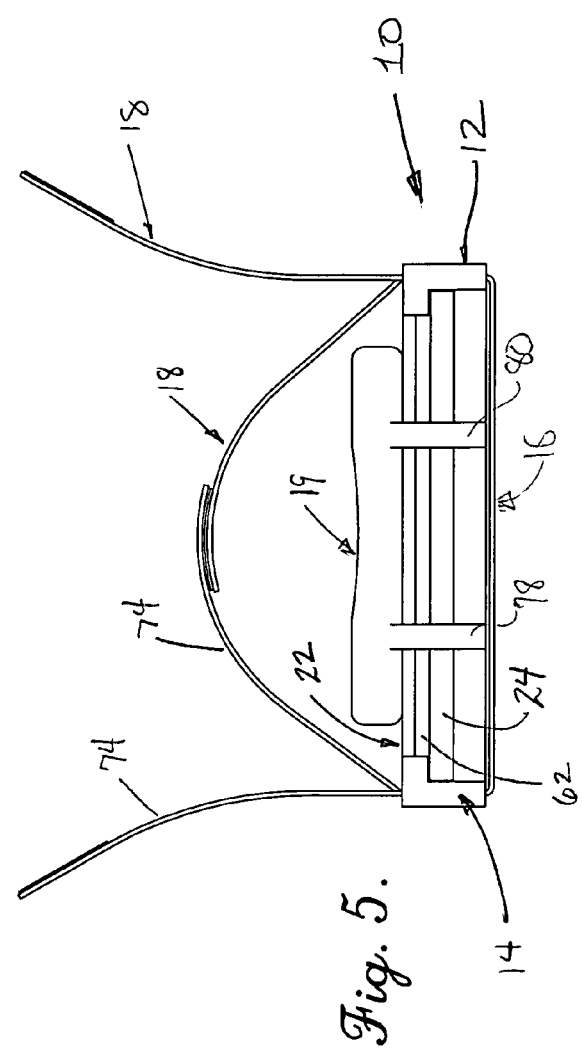

PORTABLE SUPINE PATIENT SUPPORT AND CASSETTE HOLDER

BACKGROUND OF THE INVENTION

1. Field of the Invention

The present invention broadly concerns a support for a patient undergoing radiographic examination of the spine which removable receives an imaging cassette. More particularly, it is concerned with a support which is substantially transparent to X-rays or other radiographic imaging media and which may be assembled from component parts for ease of transport and storage while also aiding in the restraint of patients against movement during radiographic imaging.

2. Description of the Prior Art

During the medical examination and evaluation of patients suffering from spinal injury or deformation such as scoliosis of the spine, it is an accepted medical practice to use X-ray photography or other radiographic imaging. During such imaging, the patient is preferably positioned between a radiographic source and imaging media such as film. The film is typically held in a cassette for ease of development and handling, and to facilitate taking several images.

In the case of some patients who are injured, young or infirm, such as those suffering from muscular distrophy or paraplegia, it is not possible to perform the imaging while the patient is in a standing position or sitting upright. In these circumstances, the patient is often placed in a supine position in order to obtain an acceptable image of the spine. As a result, a relatively large cassette, and holder for the cassette, must often be employed in order to obtain a full-length image of the spine, and a support must be provided for the patient which is of commensurate size.

One solution to the problem of holding a film cassette for patients in a supine position is illustrated by my U.S. Design Pat. No. 378,951, the disclosure of which is incorporated herein by reference. Shown therein is an ornamental design for a supine x-ray cassette holder which permits the nurse or technician to slide X-ray film cassettes through an opening at one end, and a perimeter ridge for supporting a radiographically translucent or transparent panel so that the patient is supported proximate, but above the X-ray film cassette. While the invention shown therein is both attractive and useful, there is a need for an improved patient support and radiographic film cassette holder to improve the comfort to the patient, the portability of the holder, and in the ability to restrain patients during radiographic examination.

SUMMARY OF THE INVENTION

These and other objects have largely been met by the improved portable supine patient support and cassette holder of the present invention. That is to say, the present invention includes modular components which provide improved portability, enhanced patient support, and also restraining features which enhance the ability to inhibit patient movement for a limited time during X-ray or other radiographic imaging. The modular components not only facilitate portability, but also storage, such that it is possible for the invention hereof to enjoy expanded usage beyond typical hospital environments to include in ambulances or field hospitals where a full-sized unitary support would be impractical. Such usage would be especially beneficial in the case of spinal injury patients to limit the number of transfers to which the patient was subjected.

Broadly speaking, the portable supine patient support and cassette holder hereof includes a base cassette receiver comprised of a plurality of modules which are releaseably interconnectable with one another and adapted to receive a panel for supporting a patient thereon. Preferably, the modules are connected in alignment by the use of integral attachment elements which interfit with one another. Each of the modules preferably include side rails and partial end rails by which a removable panel may be received for supporting a patient thereon. A gap is provided between the partial end rails and a base frame so that film cassettes may be inserted and removed without disturbing the patient or disassembling the cassette holder. Furthermore, the use of modular components would permit the combination of different lengths of modules, such that a longer or shorter second module could be employed in combination with the same first module.

The modules of the cassette holder hereof preferably include partial end rails so that the longitudinal ends of the base cassette receiver include a passage which is substantially open while inhibiting longitudinal shifting of the patient support panel. This open end arrangement improves the comfort to the patient by avoiding narrow frame members which may discomfort the patient's neck or legs extending beyond the base member. Moreover, the cassette holder hereof includes removably mounted head and foot supports. These are also provided as modular members in order to enhance the storage and portability of the unit, while providing for rigid mounting to facilitate patient stability in a supine position during imaging. Most preferably, the head and foot supports are constructed complementally with the cassette holder whereby the top surface of the foot and head supports are, when mounted, positioned to be substantially coplanar to the top surface of the mounted patient support panel. In especially preferred embodiments, the base cassette receiver modules include slots through the side rails for receiving restraining straps therethrough. The straps may be of any relatively thin flexibile material such a leather with buckle or strap fasteners, or more preferably lightweight fabric provided with hook and loop fabric fasteners to provide flexibility of use and reduce costs. The straps are positioned to extend beneath the base cassette receiver, and the slots are preferably vertically oriented with adjacent cutouts in the side rails.

As a result, the cassette holder hereof may be conveniently stored and by virtue of its modular construction, more easily transported by smaller workers. Medical personnel may readily assemble the modules and comfortably support the patient thereon, using the restraining straps provided as necessary. Further benefits and details of the present invention will be readily appreciated by those skilled in the art with reference to the detailed description and drawings hereof.

BRIEF DESCRIPTION OF THE DRAWINGS

FIG. 4 is a right side elevational view of the invention hereof, the left side view being a mirror image thereof;

FIG. 5 is an end elevational view taken from the end of the cassette holder having the head support and showing an x-ray cassette positioned below the support panel;

DESCRIPTION OF THE PREFERRED EMBODIMENT

Figure 2:
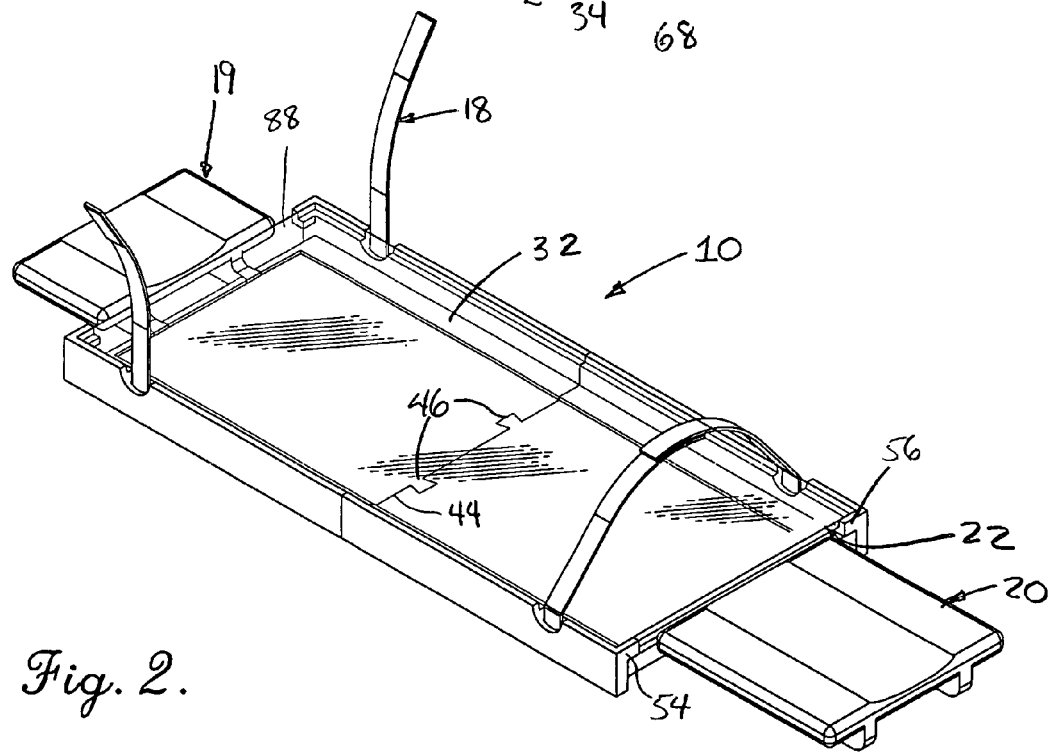
FIG. 2 is a perspective view similar to FIG. 1, but showing the invention hereof in an assembled condition with the support panel received on the side rails and partial end rails of the base cassette receiver and one of the restraining straps in an attached condition.

Referring now to the drawing, a portable supine patient support and cassette holder 10 in accordance with the present invention preferably includes a base cassette receiver 12 having at least a first module 14 and a second module 16 removably interconnected thereto, a patient restraint 18, an optional headrest 19, an optional footrest 20 and, as shown in FIG. 2, a patient support panel 22. While described as a supine patient support, it is to be understood that the orientation of the patient on the support is a matter of medical discretion, and that the patient may be positioned also in a left or right lateral position (i.e. on either of the patient's side), or in a prone position. Also, by repositioning the patient on the support and cassette holder 10 hereof, radiographic images may be also be taken of other parts of the patient's body, such as positioning the legs atop the patient support panel 22 for lower extremity radiographs for leg length and other evaluations. Thus, the use of the term "supine" in the title is the most common, but certainly not the only, position of the patient in connection with the use of the patient support and cassette holder 10 hereof.

Figure 1:
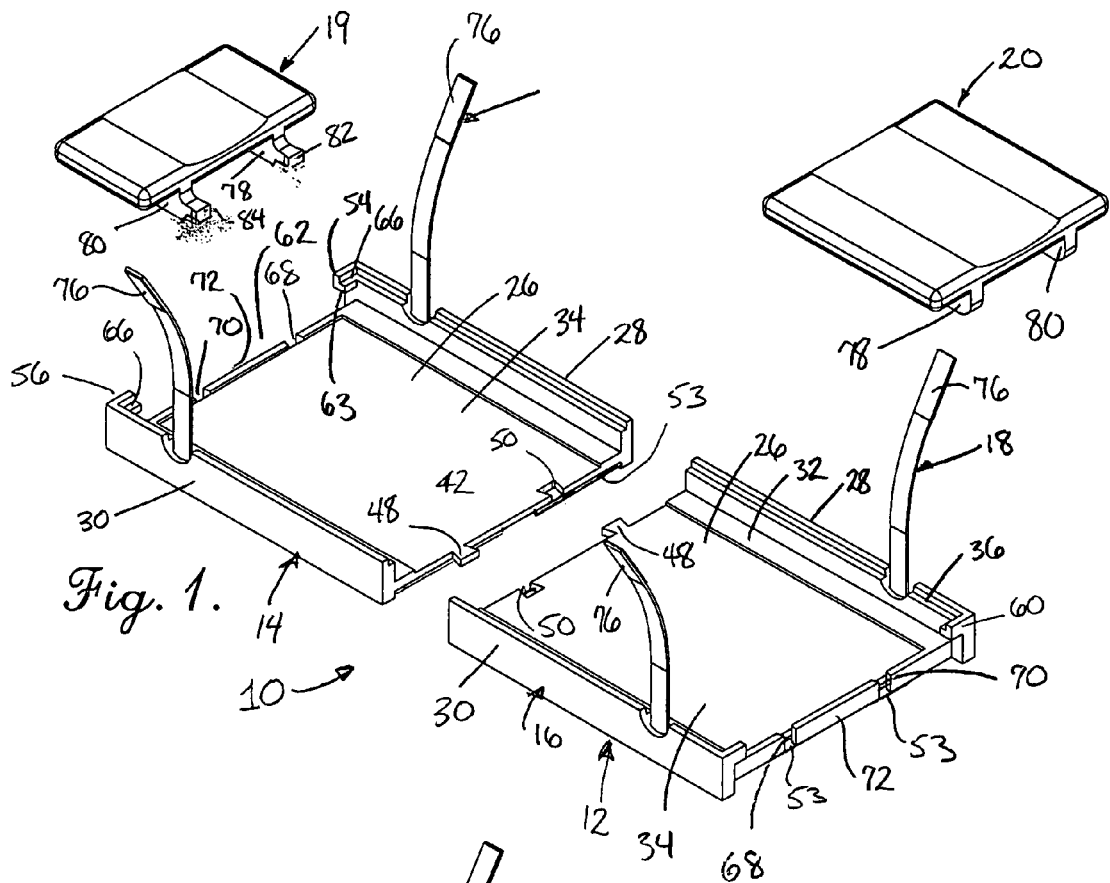
FIG. 1 is an exploded perspective view of the portable supine patient support and cassette holder hereof, showing the optional head rest and foot rest detached from the base cassette receiver and without the support panel.

In greater detail, the base cassette receiver 12 is configured to permit receipt of an X-ray film cassette 24 through either of the longitudinally spaced ends thereof, a schematic showing of such a cassette being shown in FIG. 5. The base cassette receiver is preferably constructed of a lightweight material which is transparent to X-rays, and may be constructed of wood or more preferably the modules 14 and 16 are molded of synthetic resin. The base cassette receiver 12 is preferably comprised of the first module 14 and the second module 16 which are complementarily configured to fit together as shown in FIGS. 1 and 2, and are designed to be connected and detached without the use of tools. Each of the first and second modules 14 and 16 includes a base wall 26 and a pair of spaced, opposed first and second sidewalls 28 and 30. The base wall 26 includes a raised perimeter shoe 32 which, when the first and second modules are connected as shown in FIG. 2, surrounds a substantially planar area 34 which preferably conforms in size to that of the cassette 24 to help locate the cassette and retain it in position. The sidewalls 28 and 30 include a shelf 36 which is elevated relative to the base wall 26 and is sized and configured to support the panel 22 thereon. The sidewalls 28 and 30 also include cutouts 38 at selected locations therealong, and vertical slots 40 which extend vertically through the sidewalls 28 and 30 as illustrated by the dashed lines in FIG. 4. The slots 40 are preferably positioned in the cutouts 38 and are adapted to receive therethough the patient restraints 18.

Figure 6:
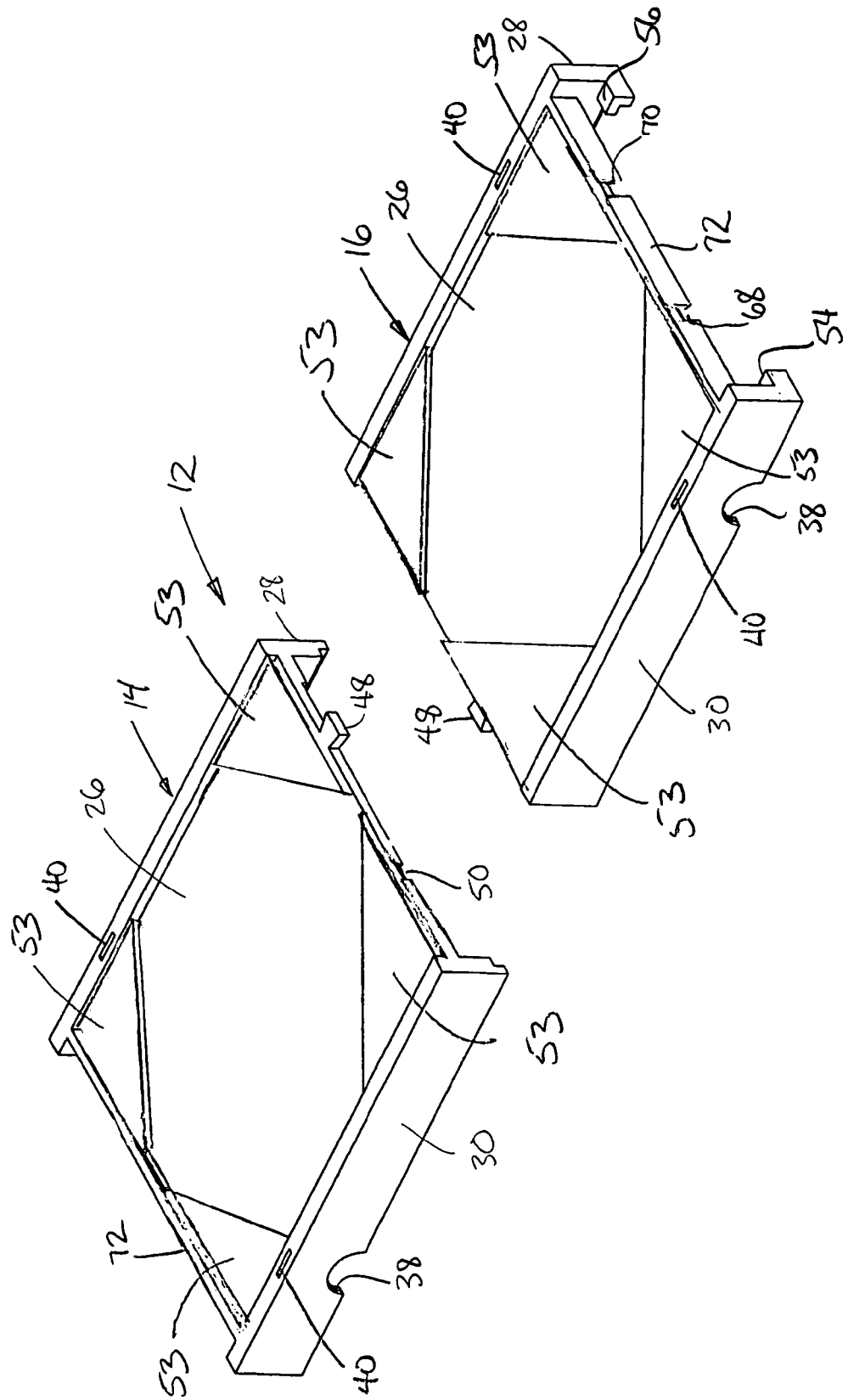
FIG. 6 is an inverted exploded perspective view of the cassette holder hereof; showing reinforcing gussets on the bottom side of the cassette holder which limit vertical displacement of the optional head rest and foot rest and also of the first and second modules relative to one another when the cassette holder is assembled.

The first and second modules 14 and 16, which are preferably identical in construction, meet along their respective mating margins 42 and 44 when connected as shown in FIG. 2, and preferably the mating margins meet approximately midway along the longitudinal length of the base cassette receiver 12. The mating margin 42 of the first module 14 includes a connector 46, shown here as a dovetail 48 and a dovetail-shaped recess 50. Similarly, the central margin 44 of the second module 16 includes a connector 52, shown here also as a dovetail 48, and a dovetail-shaped recess 50 positioned and configured to receive the dovetail 48 of the first module 14. While other configurations of attachment members may be used, the dovetail connection as illustrated permits the proper alignment and interfitting of the modules 14 and 16 while resisting their separation. Further, the use of one dovetail 48 and one dovetail-shaped recess 50 on each of the two modules 14 and 16 helps the connector 46 to ensure that the modules 14 and 16 are properly aligned, mated and connected. As seen in FIG. 6, a plurality of reinforcing members shown as gussets 53 are preferably provided on the underside of the base wall, which gussets are preferably molded as an integral and unitary part of each of the first and second modules. The gussets 53 are positioned beneath the dovetail-shaped recesses to help properly align the dovetail 48 with the recess 50 and thereby prevent the dovetail 48 from passing vertically through the recess 48. As a result, when the first and second modules 14 and 16 are assembled, the base wall 26 of each of the modules 14 and 16 are substantially coplanar and resist separation.

Each of the modules 14 and 16 further include an opposed, inwardly projecting pair of arms 54 and 56, which form respective a partial first and second endwalls 58 and 60 for the first and second modules 14 and 16. In this regard, the arms of each module extend inwardly less than the full width of the modules, and as seen in FIGS. 1, 2 and 5, the arms of each module extend inwardly toward each other only a short distance, providing a passage 62 therebetween. The arms 54 and 56 are spaced above the perimeter shoe 32 and provide a gap 63 between the perimeter shoe 32 and the arms which facilitates insertion, retention, removal and positioning of the film cassette 24. Each of the arms is also recessed proximate its respective top margin 64 to provide a ledge 66 which is co-planar with the shelf 36. The ledge 66 of each arm as well as the shelf 36 serve to support and locate the panel 22 and to resist its horizontal movement. Thus, when the footrest or headrest is not attached, the spacing of the arms 54 and 56 above the perimeter shoe 32 permits a film cassette 24 to be inserted and removed through the passage 62 and gap 63 and beneath the support panel 22.

Figure 3:
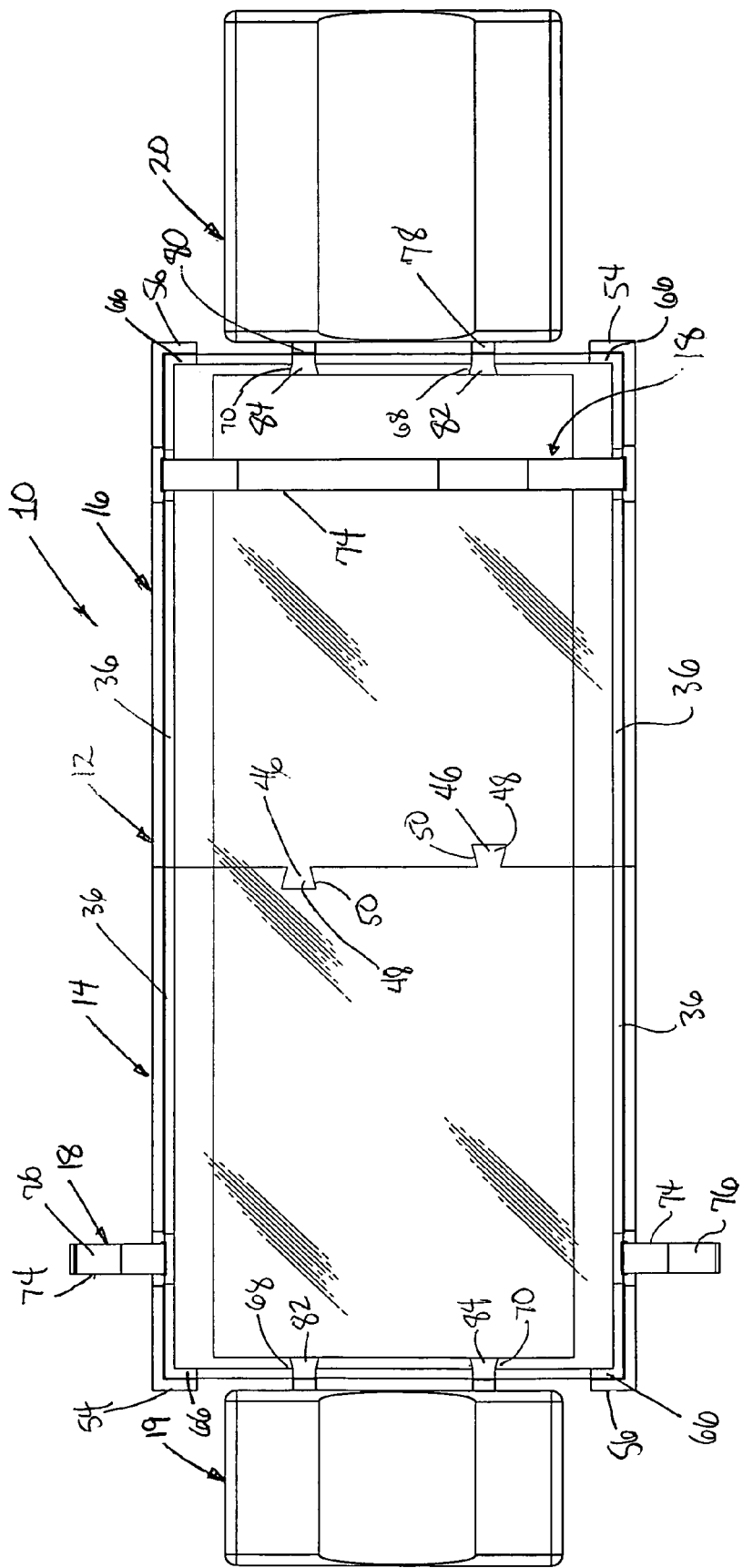
FIG. 3 is a plan view of the invention hereof, showing one of the restraining straps in an attached condition and illustrating the placement of the slots along the side rails.

The first and second modules 14 and 16 of the base cassette receiver 12 each also advantageously include a pair of spaced openings preferably configured as dovetail slots 68 and 70 which are positioned in the end portions 72 of the perimeter shoe 32 opposite the central margin 44. As may be seen in FIG. 3, the dovetail slots 68 and 70 are sized and positioned in the same way in both the first module 14 and the second module 16, thereby permitting the headrest 19 and the footrest 20 to be positioned and connected to either the first or second module. Also, to provide proper vertical alignment of the headrest 19 and footrest 20, so that the top surface of the headrest and the top surface of the footrest is substantially coplanar with the top surface of the patient support panel, a portion of the reinforcing members such as gussets 53 preferably extend into the end portions 72 so as to block a bottom part of the dovetail slots 68 and 70. Thus, the headrest 19 and footrest 20, when mounted in the dovetail slots 68 and 70, are prevented from excessive downward movement so as to fall downwardly out of connection with the cassette holder modules.

The patient support panel 22 is also preferably substantially transparent to X-rays and is sufficiently strong and rigid enough to support the weight of a patient thereon without breaking. The patient support panel 22 is sized to be supported within the siderails and the arms 54 and 56 and atop the shelf 36 and ledge 62 of each arm. Because the arms 54 and 56 provide only a partial endwall 58 and 60 of each of the first and second modules, it is relatively easy to reach beneath the patient support panel 22 for placement on and removal from the shelf 36 and ledge 66.

The patient restraints 18 are preferably provided as straps 74 which extend through the slots 40 and beneath the base cassette receiver 12 as shown in FIGS. 4 and 5. The straps 74 may be of any of a variety of different lightweight, flexible materials, but most preferably are of a fabric such as cotton or nylon which does not interfere with radiography and may be readily adjusted and attached together using hook and loop fasteners 76 affixed at the free ends of the straps 74, such as is sold under the trademark VELCRO®.

As noted above, the headrest 19 and the footrest 20 are removably mountable without the need for tools, and may be coupled to either of the first or second modules. The headrest 19 and the footrest 20 may be made of any material of sufficient strength, including wood or more preferably molded of synthetic resin material, and sized to provide suitable support and comfort for the patient. Both the headrest 19 and the footrest 20 include feet 78 and 80 which are commonly configured and complementally configured with dovetails 82 and 84 to fit into the corresponding openings which are preferably dovetail slots 68 and 70. Because the gussets 53 extend into the bottom part of what would otherwise be a lower extension of the dovetail slots 68 and 70, the vertical height of the dovetails 82 and 84 are constructed so that the dovetails of the feet 78 and 80 of the headrest and footrest are fit within the dovetails when fully seated so that a top surface 86 of the headrest 19 and a top surface 90 of the footrest 20 are coplanar with the patient support. Either or both the headrest and footrest may be mounted, as desired, and are cantilevered from the first and second modules as illustrated in FIGS. 2 and 4. Thus, when mounted to the cassette holder 12, the headrest 19 is especially configured whereby a top surface 86 thereof lies substantially in the same plane as the top surface 88 of the patient support panel 22 as shown in FIGS. 4 and 5. Similarly, the footrest also has its top surface 90 which, when mounted to the cassette holder 12, positions the top surface 90 substantially coplanar with the top surface 88 of the patient support panel 22, as shown in FIG. 4.

In use, the portable supine patient support and cassette holder 10 hereof may be advantageously stored in its component parts as illustrated in FIG. 1 (the support panel 22 not appearing in that figure for clarity) and then assembled for use as needed as shown in FIGS. 2, 3, 4 and 5. This is especially advantageous when used by medical personnel of smaller stature because of the light weight and small size of the components, and permits storage in areas such as ambulances where space is at a premium. The portable supine patient support and cassette holder 10 may be assembled without the necessity of tools and its assembly is intuitive and may be quickly accomplished in emergency situations.

After assembly, the portable supine patient support and cassette holder 10 may be placed on any supportive surface, such as an X-ray examination table. In addition, when suspected spinal injuries are encountered in the field, the portable supine patient support and cassette holder 10 may be placed atop a Gurney or the like, with the headrest and footrest employed to comfortably support the patient's head and legs with proper positioning of the head and feet relative to the spine to provide the desired supine or lateral position for imaging. If necessary, pillows or cushions may also be employed for proper positioning and comfort or support of an injured patient. When so used, the number of patient transfers may be reduced. The patient is then placed atop the patient support panel 22. The film cassette is inserted through the passage (either prior to mounting of the headrest or footrest or when one of the headrest and footrest is removed). A radiographic image may then be taken as desired. By way of example, when a scoliosis patient is to have a spinal x-ray taken, the image may be taken in an anterior-posterior (AP) view with the patient lying on his or her back, and then a left and/or right lateral image is taken with the patient lying on his or her right or left side. The portable supine patient support and cassette holder 10 may also be used for lower extremity radiographs for purposes such as leg-length evaluations. Those skilled in the art will appreciate that the portable supine patient support and cassette holder 10 may be used for a variety of other radiographic imaging purposes as medical conditions indicate.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, it is to be understood that the particular configuration of the connectors employed for attaching the modules 14 and 16 or for attaching the headrest and footrest may be varied, with the showing of dovetails and dovetail recesses or dovetail slots being simply a showing of the preferred embodiement. The openings in the modules may be of other configurations suitable for coupling the other module or the headrest or footrest thereto, and the recesses and slots can be a blind recess or dovetail which extends either only partially through the material of the base wall and perimeter shoe to position the modules both vertically as well as transversely and longitudinally, or extend fully through the base wall and perimeter shoe as shown.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. A portable patient support and radiographic cassette holder comprising:
    a base cassette receiver having a base wall and opposed first and second sidewalls, said base cassette receiver having a longitudinal length and including first and second separate and interconnecting modules each of said modules extending a part of the longitudinal length and, when interconnected, forming the base wall and first and second sidewalls, each of said modules having respective endwalls and mating margins including unitary, complemental connector structure for enabling attachment of the modules along their respective mating margins; and
    a patient support supported by said base cassette receiver, wherein the endwall of at least one of said modules is provided with a gap configured to permit insertion of a radiographic cassette into the base cassette receiver atop the modules and below the patient support.

2. A portable patient support and radiographic cassette holder as set forth claim 1, wherein each of said first and second modules is of the same configuration.

3. A portable patient support and radiographic cassette holder as set forth in claim 1, wherein each of the modules includes a pair of inwardly extending arms longitudinally spaced from their respective mating margins, presenting a passage between the arms.

4. A portable patient support and radiographic cassette holder as set forth in claim 3, wherein the arms are connected to the sidewalls and spaced upwardly from the base wall to present a gap between the arms and the base wall.

5. A portable patient support and radiographic cassette holder as set forth in claim 4, wherein the arms include a ledge therein.

6. A portable patient support and radiographic cassette holder as set forth in claim 5, wherein the sidewalls include a shelf which is substantially coplanar with the ledge of the arms.

7. A portable patient support and radiographic cassette holder as set forth in claim 6, wherein said patient support a support panel mounted on said shelf and said ledge in spaced relationship above the base wall and extending substantially the longitudinal length of the base cassette receiver.

8. A portable patient support and radiographic cassette holder as set forth in claim 1, wherein said base wall includes a perimeter shoe defining a recess adapted to receive a film cassette therein.

9. A portable patient support and radiographic cassette holder as set forth in claim 1, wherein each of said sidewalls include a slot, and further including a flexible patient restraint extending through said slot.

10. A portable patient support and radiographic cassette holder as set forth in claim 9, wherein said patient restraint includes a pair of free ends having hook and loop fasteners coupled thereto.

11. A portable patient support and radiographic cassette holder as set forth in claim 1, wherein said base cassette receiver includes at least one slot in an end of one of the modules opposite the mating margin thereof, and further including a footrest including an arm complementally configured with said one slot for removably coupling said footrest to the base cassette receiver without the need for tools.

12. A portable patient support and radiographic cassette holder as set forth in claim 11, wherein said footrest has a top surface and said patient support panel includes a top surface, said top surface of said footrest being located substantially coplanar with the top surface of said patient support panel when the footrest is mounted on said base cassette receiver.

13. A portable patient support and radiographic cassette holder as set forth in claim 1, wherein said base cassette receiver includes at least one slot in an end of one of the modules opposite the mating margin thereof, and further including a headrest including an arm complementally configured with said one slot for removably coupling said headrest to the base cassette receiver without the need for tools.

14. A portable patient support and radiographic cassette holder as set forth in claim 13, wherein said headrest has a top surface and said patient support panel includes a top surface, said top surface of said headrest being located substantially coplanar with the top surface of said patient support panel when the headrest is mounted on said base cassette receiver.

15. A portable patient support and radiographic cassette holder as set forth in claim 13, wherein said base cassette receiver includes at least a second slot in an end of the other of the modules opposite the mating margin of the second module and longitudinally spaced from the one slot of the one of the modules when coupled to the other of the modules, and further including a footrest including an arm complementally configured with said second slot for removably coupling said footrest to the base cassette receiver without the need for tools.

16. A portable patient support and radiographic cassette holder comprising a base cassette receiver having a base wall and opposed first and second sidewalls, said base cassette receiver including first and second separate and interconnecting modules forming the base wall and first and second sidewalls, each of said modules having respective mating margins including unitary, complemental connector structure for enabling attachment of the modules along their respective mating margins, wherein said connector structure of said first and second modules includes at least one dovetail on one of said modules and a complementally configured dovetail recess on the other of said modules.

17. A portable patient support and radiographic cassette holder as set forth in claim 16, wherein each of said modules includes at least one dovetail and a complementally configured dovetail recess.

18. A portable patient support and radiographic cassette holder as set forth in claim 17, wherein each of said modules is of the same configuration.

* * * * *